Aug. 18, 1953     P. ANGENIEUX     2,649,022
WIDE-ANGLE PHOTOGRAPHIC OBJECTIVE LENS ASSEMBLY
Filed July 29, 1950

Patented Aug. 18, 1953

2,649,022

UNITED STATES PATENT OFFICE 2,649,022

WIDE-ANGLE PHOTOGRAPHIC OBJECTIVE LENS ASSEMBLY

Pierre Angénieux, Paris, France

Application July 29, 1950, Serial No. 176,573
In France February 17, 1950

8 Claims. (Cl. 88—57)

The invention relates to a wide-angle objective characterized by the fact that the distance along the axis between the back surface of the last lens and the focal plane of the objective is relatively very large with respect to the focal length of the objective.

It is known that in some photographic or cinematographic cameras, notably of the Reflex type, it is not possible to use conventional wide-angle objectives, since these could not be placed sufficiently near to the sensitive surface for obtaining a suitable focusing of the camera. The space occupied by the mirror in Reflex cameras or by the shutter in cinematographic cameras is too large for permitting the use of objectives wherein the distance between the last lens and the focal plane is short.

Various suggestions have already been made in view of overcoming this drawback. However, the results obtained so far are inferior to those obtained by using conventional wide-angle objectives.

This invention offers a novel solution to this problem whereby the quality of the image may be materially improved in a very wide field angle in relation to the objective aperture, while the "vignetting" effect inherent in wide-angle objectives is reduced to a considerable extent.

One object of this invention is to provide an objective consisting, on the one hand, of a negative meniscal lens having its convex side directed to the front and, on the other hand, a convergent optical device positioned at a relatively great distance at the back of the negative lens.

Figure 1:
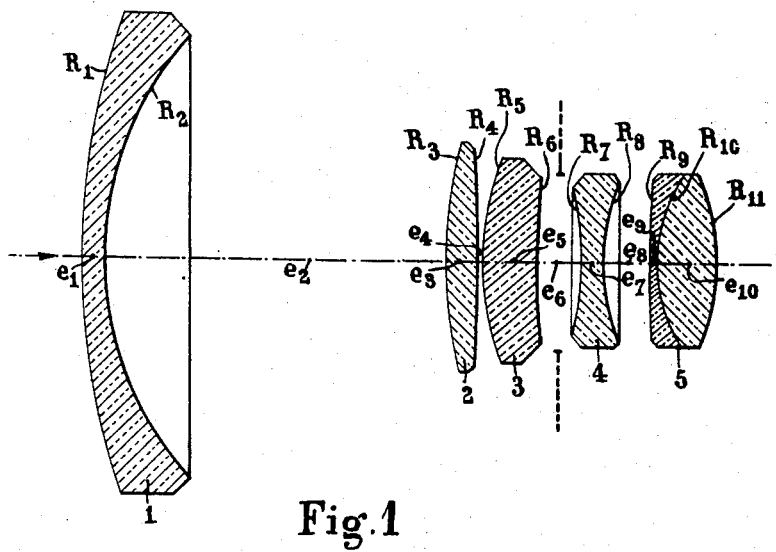
Fig. 1 is a sectional and diagrammatical view of a first objective according to the invention.

In said figures, 1 or 1a is the negative lens. The convergent device comprises in succession in the direction of the light rays: a convergent lens 2 or 2a, a convergent meniscal lens 3 or 3a having its convex side turned to the front, a biconcave lens 4 or 4a and a composite lens 5 or 5a having a positive power, the other three lenses consisting of either a single lens or several component lenses made of two or more single lenses cemented together.

From the computations and tests I have made, it appears that with an objective according to the invention it is possible to attain a very accurate correction of the distortion and coma for a wide aperture while maintaining a sufficient astigmatic correction in an extensive field of view.

Coma may be corrected in a very satisfactory manner, especially for those light rays which are moderately or strongly inclined to the axis, even if large diameter front lens and back lens are used in order to reduce as much as possible the "vignetting" effect.

These results are obtained when the objective is so constructed as to comply with the requirements described hereafter:

In the following paragraphs the various component lenses of the objective are designated according to their order in the direction of the light rays, i. e. the negative front lens is 1 or 1a, the convergent lens disposed in front of the convergent device is 2 or 2a, and so forth. On the other hand, the axial air gap between two successive lenses will be called "distance between lenses".

The absolute value of the focal length of the meniscal negative lens 1 or 1a, which has its convex side turned toward the front side is lower than four times the focal length of the objective assembly and greater than the said focal length and the distance from the rearmost lens to the focal plane is greater than 0.9 times the focal length of the objective assembly and smaller than 1.3 times said focal length. In addition, it may be advantageous to comply with the following conditions considered separately or in combination:

(a) The distance between the first and second lenses 1, 2 or 1a, 2a should exceed 50% of the focal length of the objective assembly and should be inferior to twelve times the said focal length.

(b) The focal length F of the unit consisting of the two lenses 4 and 5 or 4a and 5a positioned at the rear of the objective should be greater, in absolute value, than two times the focal length $f$ of the group consisting of the lenses 2 and 3 or 2a and 3a. As a matter of fact, the former of these two groups should have a very low power which may even be zero, in which case the two lenses concerned (4 and 5, or 4a and 5a) will form an afocal system. The lower and higher limits of F are expressed as follows:

$$\frac{-1}{2f} < \frac{1}{F} < \frac{+1}{2f}$$

(c) The radius of curvature $R_2$ of the back surface of the first lens 1 or 1a should be lower than 150% of the same focal length greater than 0.6 times the said focal length.

(d) The radius of curvature $R_3$ of the front surface of lens 2 or 2a should exceed the radius of curvature $R_2$ of the back surface of lens 1 or 1a.

(e) The distance $e_3$ between lenses 4 and 5 or 4a and 5a should be lower than the thickness of lens 5 or 5a.

(f) The last lens 5a is a compound lens having a positive power and made of three lenses cemented together.

Figure 2:
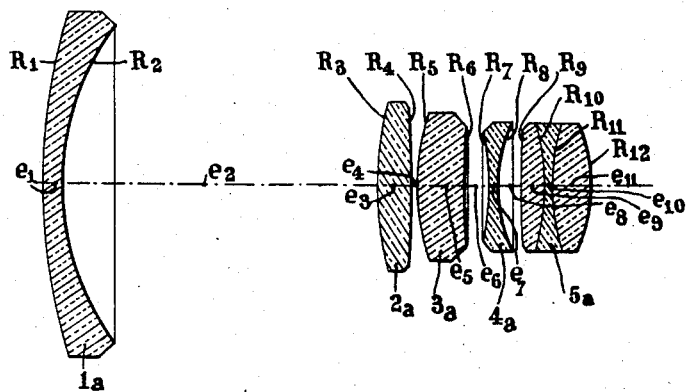
Fig. 2 is a sectional and diagrammatical view of a second objective according to the invention.

The Tables I and II given hereafter and relating respectively to Figures 1 and 2 show, by way of nonlimitative example, two embodiments of the objective according to the invention.

The example I relates to an objective having a 1:2.5 aperture and an effective field angle of 65°.

The example II relates to an objective having a 1:2.2 aperture and an effective field angle of also 65°.

In these tables $R_1 \ldots R_{12}$ are the values of the radii of the refracting surfaces counting from the front to the rear of the objectives ($e_2$, $e_4$, $e_6$, $e_8$) are the axial distances between the lenses or components, and ($e_1$, $e_3$, $e_5$, $e_7$, $e_9$, $e_{10}$, $e_{11}$) are the axial thicknesses of the lens or components counting from the front to the rear of the objectives and $(n_D)$, $(\nu)$ are, respectively, the values of the index of refraction and the dispersion ratios or Abbe numbers of the lens materials of the several lens elements.

TABLE I FOR F=100

| Radiuses | Thicknesses and Distances | Glass Quality | |
|---|---|---|---|
| | | $n_D$ | $\nu$ |
| $R_1 = +180.48$ | $e_1 = 6.33$ | 1.6145 | 59.8 |
| $R_2 = + 84.06$ | $e_2 = 93.18$ | air | |
| $R_3 = +114.40$ | $e_3 = 9.12$ | 1.6243 | 46.8 |
| $R_4 = -415.25$ | $e_4 = 0.51$ | air | |
| $R_5 = + 69.18$ | $e_5 = 17.22$ | 1.6226 | 53 |
| $R_6 = +237.45$ | $e_6 = 9.12$ | air | |
| $R_7 = - 93.48$ | $e_7 = 4.30$ | 1.6141 | 37 |
| $R_8 = + 50.54$ | $e_8 = 10.13$ | air | |
| $R_9 = +404.42$ | $e_9 = 2.28$ | 1.6287 | 35.3 |
| $R_{10} = + 38.74$ | $e_{10} = 16.20$ | 1.6391 | 55.8 |
| $R_{11} = - 55.20$ | | | |

Back focal length=105.

TABLE II FOR F=100

| Radiuses | Thicknesses and Distances | Glass Quality | |
|---|---|---|---|
| | | $n_D$ | $\nu$ |
| $R_1 = +232.29$ | $e_1 = 7.20$ | 1.6145 | 59.8 |
| $R_2 = +101.12$ | $e_2 = 125.80$ | air | |
| $R_3 = +129.79$ | $e_3 = 13.23$ | 1.6204 | 60.2 |
| $R_4 = -471.55$ | $e_4 = 0.55$ | air | |
| $R_5 = + 78.48$ | $e_5 = 19.54$ | 1.6204 | 60.2 |
| $R_6 = +269.81$ | $e_6 = 10.35$ | air | |
| $R_7 = -117.28$ | $e_7 = 3.15$ | 1.5590 | 45.4 |
| $R_8 = + 57.34$ | $e_8 = 9.41$ | air | |
| $R_9 = +343.70$ | $e_9 = 8.86$ | 1.6391 | 55.8 |
| $R_{10} = - 99.35$ | $e_{10} = 2.77$ | 1.6287 | 35.3 |
| $R_{11} = + 83.02$ | $e_{11} = 15.11$ | 1.6391 | 55.8 |
| $R_{12} = - 70.73$ | | | |

Back focal length=103.8.

In the second example the use of a triplet for the last lens has permitted, for the chromatic correction, to give to the cemented faces of the components smaller curvature, resulting in an advantageous effect on the chromatic correction of the spherical aberration. This is the principal advantage of the use of a triplet. It is obvious that the most efficient arrangement for making this last lens is to cement on either side of a negative biconcave lens of the flint type two lenses of the crown or barium crown type having a positive power.

What I claim as new is:

1. A wide-angle objective in which the axial distance from the rear lens to the focal plane thereof is greater than 0.9 times the focal length of the objective assembly and less than 1.3 times the said focal length, consisting of two parts, one collective and the other dispersive, the collective part comprising two members, namely: a front member including a collective lens and a collective meniscus lens having its convex surface directed toward the front and a rear member including a biconcave lens and a collective lens, said rear member having a focal power (the reciprocal of the focal length) which is algebraically comprised between two limits the absolute value of said limits being equal to half the focal power of the front member but having opposite signs; the dispersive part consisting of a dispersive meniscus lens having its convex surface directed toward the front and being positioned in front of the collective part at an axial distance greater than 50% of the focal length of the objective assembly and less than 12 times said focal length, the focal length of said dispersive meniscus lens having an absolute value smaller than four times the focal length of the objective assembly and greater than said focal length, one at least of the lenses constituting the two parts consisting of a plurality of simple component lenses cemented together.

2. A wide-angle objective according to claim 1, wherein the radius of curvature of the back surface of said dispersive meniscus lens is smaller than 150% of the focal length of the objective assembly and greater than 0.6 times said focal length.

3. A wide-angle objective in which the axial distance from the rear lens to the focal plane thereof is greater than 0.9 times the focal length of the objective assembly and less than 1.3 times the said focal length, consisting of two parts, one collective and the other dispersive, the collective part comprising two members, namely: a front member including a collective lens and a collective meniscus lens having its convex surface directed toward the front and a rear member including a biconcave lens and a collective doublet consisting of a negative lens and a collective lens cemented together, said rear member having a focal power (the reciprocal of the focal length) which is algebraically comprised between two limits the absolute value of said limits being equal to half the focal power of the front member but having opposite signs; the dispersive part consisting of a dispersive meniscus lens having its convex surface directed toward the front and being positioned in front of the collective part at an axial distance greater than 50% of the focal length of the objective assembly and less than 12 times said focal length, and the focal length of said dispersive meniscus lens having an absolute value smaller than four times the focal length of the objective assembly and greater than said focal length.

4. A wide-angle objective in which the axial distance from the rear lens to the focal plane thereof is greater than 0.9 times the focal length of the objective assembly and less than 1.3 times the said focal length, consisting of two parts, one collective and the other dispersive, the collective part comprising two members, namely: a front member including a collective lens and a collective meniscus lens having its convex surface directed toward the front and a rear member having a focal power (the reciprocal of the focal length) which is algebraically comprised between two limits, the absolute value of said limits being equal to half the focal power of the front member but having opposite signs, said rear member including a biconcave lens and a collective triplet consisting of a biconcave dispersive lens of the flint type to which are cemented respectively on each side two collective lenses of the crown type; the dispersive part consisting of a dispersive meniscus lens having its convex surface directed toward the front and being positioned in front of the collective part at an axial distance greater than 50% of the focal length of the objective assembly and less than 12 times said focal length and the focal length of said dispersive meniscus lens having an absolute value smaller than four times the focal length of the objective assembly and greater than said focal length.

5. A wide-angle objective in which the axial distance from the rear lens to the focal plane thereof is greater than 0.9 times the focal length of the objective assembly and less than 1.3 times the said focal length, consisting of two parts, one collective and the other dispersive, the collective part comprising two members, namely: a front member including a collective lens and a collective meniscus lens having its convex surface directed toward the front and a rear member including a biconcave lens and a collective lens, said rear member having a focal power (the reciprocal of the focal length) which is algebraically comprised between two limits, the absolute value of said limits being equal to half the focal power of the front member but having opposite signs; the dispersive part consisting of a dispersive meniscus lens having its convex surface directed toward the front and being positioned in front of the collective part at an axial distance greater than 50% of the focal length of the objective assembly and less than 12 times said focal length, the focal length of said dispersive meniscus lens having an absolute value smaller than four times the focal length of the objective assembly and greater than said focal length, one at least of the lenses constituting the two parts consisting of a plurality of simple component lenses cemented together, and the radius of curvature of the back surface of the front dispersive meniscus lens being smaller than the radius of curvature of the front face of the first collective lens of the collective part.

6. A wide-angle objective in which the axial distance from the rear lens to the focal plane thereof is greater than 0.9 times the focal length of the objective assembly and less than 1.3 times the said focal length, consisting of two parts, one collective and the other dispersive, the collective part comprising two members, namely: a front member including a collective lens and a collective meniscus lens having its convex surface directed toward the front and a rear member including a biconcave lens and a collective lens, said rear member having a focal power which is algebraically comprised between two limits, the absolute value of said limits being equal to half the focal power of the front member but having opposite signs; the dispersive part consisting of a dispersive meniscus lens having its convex surface directed toward the front and being positioned in front of the collective part at an axial distance greater than 50% of the focal length of the objective assembly and less than 12 times said focal length, the focal length of said dispersive meniscus lens having an absolute value smaller than four times the focal length of the objective assembly and greater than said focal length, one at least of the lenses constituting the two parts consisting of a plurality of simple component lenses cemented together, the third and fourth lenses of the collective part being spaced by air at an axial distance apart which is smaller than the thickness of said fourth lens of the collective part.

7. A wide-angle objective having the following numerical data:

Focal length F=100. Relative aperture: 1/2.5

| Radiuses | Thicknesses and distances | Glass Quality | |
|---|---|---|---|
| | | $n_D$ | $\nu$ |
| $R_1 = +180.48$ | $e_1 = 6.33$ | 1.6145 | 59.8 |
| $R_2 = +84.06$ | $e_2 = 93.18$ | air | |
| $R_3 = +114.40$ | $e_3 = 9.12$ | 1.6243 | 46.8 |
| $R_4 = -415.25$ | $e_4 = 0.51$ | air | |
| $R_5 = +69.18$ | $e_5 = 17.22$ | 1.6226 | 53 |
| $R_6 = +237.45$ | $e_6 = 9.12$ | air | |
| $R_7 = -93.48$ | $e_7 = 4.30$ | 1.6141 | 37 |
| $R_8 = +50.54$ | $e_8 = 10.13$ | air | |
| $R_9 = +404.42$ | $e_9 = 2.28$ | 1.6287 | 35.3 |
| $R_{10} = +38.74$ | $e_{10} = 16.20$ | 1.6391 | 55.8 |
| $R_{11} = -55.20$ | | | |

Back focal length=105.

wherein $R_1 \ldots R_{11}$ are the values of the radii of the refracting surfaces counting from the front to the rear of the objective: ($e_2, e_4, e_6, e_8$) are the axial distances between the lenses or components, and ($e_1, e_3, e_5, e_7, e_9, e_{10}$) are the axial thicknesses of the lens or components counting from the front to the rear of the objective; and ($n_D$), ($\nu$) are, respectively, the values of the index of refraction and the dispersion ratios or Abbe numbers of the lens materials of the several lens elements.

8. A wide-angle objective having the following numerical data:

Focal length F=100. Relative aperture: 1/2.2

| Radiuses | Thicknesses and distances | Glass Quality | |
|---|---|---|---|
| | | $n_D$ | $\nu$ |
| $R_1 = +232.29$ | $e_1 = 7.20$ | 1.6145 | 59.8 |
| $R_2 = +101.12$ | $e_2 = 125.80$ | air | |
| $R_3 = +129.79$ | $e_3 = 13.23$ | 1.6204 | 60.2 |
| $R_4 = -471.55$ | $e_4 = 0.55$ | air | |
| $R_5 = +78.48$ | $e_5 = 19.54$ | 1.6204 | 60.2 |
| $R_6 = +269.81$ | $e_6 = 10.35$ | air | |
| $R_7 = -117.28$ | $e_7 = 3.15$ | 1.5590 | 45.4 |
| $R_8 = +57.34$ | $e_8 = 9.41$ | air | |
| $R_9 = +343.70$ | $e_9 = 8.86$ | 1.6391 | 44.8 |
| $R_{10} = -99.35$ | $e_{10} = 2.77$ | 1.6287 | 35.3 |
| $R_{11} = +83.02$ | $e_{11} = 15.11$ | 1.6391 | 55.8 |
| $R_{12} = -70.73$ | | | |

Back focal length—103.8.

wherein $R_1 \ldots R_{12}$ are the values of the radii of the refracting surfaces counting from the front to the rear of the objective; ($e_2, e_4, e_6, e_8$) are the axial distances between the lenses or components, and ($e_1, e_3, e_5, e_7, e_9, e_{10}, e_{11}$) are the axial thicknesses of the lens or components counting from the front to the rear of the objective; and ($n_D$), ($\nu$) are, respectively, the values of the index of refraction and the dispersion ratios or Abbe numbers of the lens materials of the several elements.

PIERRE ANGÉNIEUX.

References Cited in the file of this patent

UNITED STATES PATENTS

| Number | Name | Date |
|---|---|---|
| 1,862,950 | Ball | June 14, 1932 |
| 1,863,099 | Bowen | June 14, 1932 |
| 1,897,262 | Kitroser | Feb. 14, 1933 |
| 1,910,492 | Mellor | May 23, 1933 |
| 1,934,561 | Rayton | Nov. 7, 1933 |
| 1,955,590 | Lee | Apr. 17, 1934 |
| 2,105,799 | Tronnier | Jan. 18, 1938 |
| 2,126,126 | Merte | Aug. 9, 1938 |
| 2,259,004 | Schade | Oct. 14, 1941 |
| 2,336,300 | Schade | Dec. 7, 1943 |

FOREIGN PATENTS

| Number | Country | Date |
|---|---|---|
| 225,398 | Great Britain | Dec. 4, 1924 |